3804X
J. DODGE, Jr.
MODE OF PRESERVING THE NOZZLES OF BELLOWS FROM BURNING.
Patented Jan. 20, 1824.
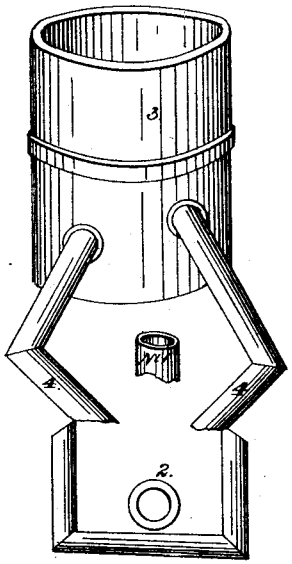
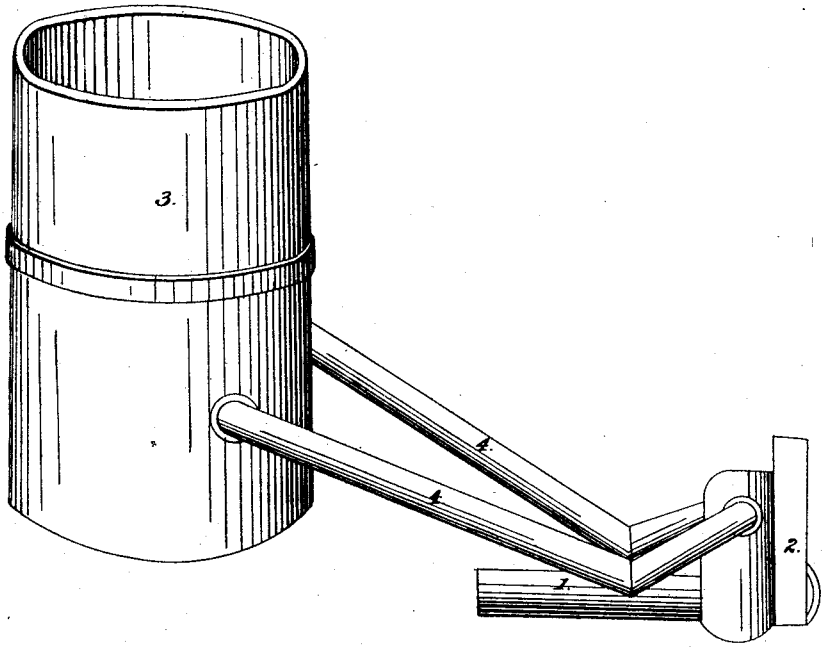
THE NORRIS PETERS CO., PHOTO-LITHO., WASHINGTON, D. C.

MISSING PAGE TEMPORARY NOTICE

PATENT # 3804X FOR ISSUE DATE 1-20-1824

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text